(12) United States Patent
Jung (10) Patent No.: US 7,729,224 B2
(45) Date of Patent: Jun. 1, 2010

(54) OPTICAL INFORMATION REPRODUCING APPARATUS AND OPTICAL INFORMATION REPRODUCING METHOD USING THE SAME

(75) Inventor: Kyu-Il Jung, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 519 days.

(21) Appl. No.: 11/687,939

(22) Filed: Mar. 19, 2007

(65) Prior Publication Data

US 2007/0236765 A1    Oct. 11, 2007

(30) Foreign Application Priority Data

Apr. 6, 2006  (KR) .................. 10-2006-0031299
Apr. 6, 2006  (KR) .................. 10-2006-0031300

(51) Int. Cl.
*G11B 7/00*    (2006.01)
(52) U.S. Cl. .............. 369/103; 369/44.32; 369/53.19; 369/112.17
(58) Field of Classification Search .............. 369/44.32, 369/53.19, 103, 112.17
See application file for complete search history.

(56) References Cited

U.S. PATENT DOCUMENTS 7,116,626 B1 * 10/2006 Woods et al. ............... 369/103
7,460,447 B2 * 12/2008 Kogure ................... 369/44.32

2003/0198158 A1    10/2003  Roh et al.
2006/0215529 A1 *  9/2006  Uno et al. .................... 369/103

FOREIGN PATENT DOCUMENTS

EP          1544854 A1    6/2005

OTHER PUBLICATIONS

European Search Report for application No. EP07005402 mailed Apr. 28, 2008.

* cited by examiner

*Primary Examiner*—Wayne R Young
*Assistant Examiner*—Brenda Bernardi
(74) *Attorney, Agent, or Firm*—Revolution IP, PLLC (57) ABSTRACT

An optical information reproducing apparatus and an optical information reproducing method using the same are provided. The optical information reproducing apparatus includes: a light source; a beam splitter which splits a beam emitted from the light source into a reference beam and a temporary beam; a temporary beam splitter which splits the temporary beam into a pair of assistant beams; an incident optical system which inputs the reference beam and the assistant beams to a recording medium in which optical information is recorded; a reproduction beam detector which detects reproduction beams reproduced in response to the reference beam, sets the position of the reproduction beam having the largest light intensity as a reference position, and sets a signal region on the basis of the reference beam; and an assistant beam detector which compares the light intensity of the assistant beams incident on the signal region with each other and sets an incident angle of the reference beam. Accordingly, it is possible to detect a tilt error and to correct the tilt error at the time of reproducing data from the recording medium.

17 Claims, 10 Drawing Sheets

OPTICAL INFORMATION REPRODUCING APPARATUS AND OPTICAL INFORMATION REPRODUCING METHOD USING THE SAME

BACKGROUND

1. Technical Field

Embodiment of the invention relates to an optical information reproducing apparatus, and more particularly, to an optical information reproducing apparatus and an optical information reproducing method, which can detect a tilt error using a reference beam and a pair of assistant beams and correct the detected tilt error.

2. Background Art

As an optical data processing apparatus, a digital versatile disc (DVD), a high-definition DVD (HD-DVD), a blu-ray disc (BD), a near field optical information processing apparatus, and a holographic optical information processing apparatus are known.

The holographic optical information processing apparatus records data by irradiating a signal beam which is optically modulated and a reference beam which serves to form an interference pattern in a recording medium, to the recording medium to intersect each other.

The holographic optical information processing apparatus reproduces the recorded data by irradiating only a reference beam to the recording medium, detecting a reproduction beam reproduced from the recording medium by the use of a detector, and processing the detecting reproduction beam.

The holographic optical information processing apparatus can repeatedly record data at the same position of an optical information recording medium in a three-dimensional manner by the use of a variety of multiplexing methods. Accordingly, it is possible to markedly enhance the storage capacity of an optical information recording medium having a limited area. Examples of multiplexing methods can include an angle multiplexing method, a phase-code multiplexing method, a wavelength multiplexing method, a fractal multiplexing method, a shift multiplexing method, and a peristrophic multiplexing method.

Optical information may not be stored only at a position on the storage medium. That is, a variety of optical information can be recorded at a variety of positions on a recording medium. Accordingly, the recording medium should be moved to a position for reproducing optical information to reproduce the optical information stored in the recording medium. For example, when the recording medium is of a disc type, the optical information is reproduced while the disc is rotated.

A method of moving the recording medium is described in U.S. Pat. No. 5,978,112, entitled "NON-VOLATILE READ-OUT OF SHIFT MULTIPLEXED HOLOGRAMS" and filed by Psaltis et al.

The US patent discloses a structure and a method of tilting a recording medium. That is, the recording medium is allowed to move using a shift servo, depending on a recording position of optical information on the recording medium at the time of recording the optical information.

As described in the U.S. patent, the recording medium which continuously moves to reproduce optical information necessarily accompanies a mechanical motion such as a rotational motion and a translational motion. Accordingly, the tilt angles of the reference beam and the recording medium can be continuously varied.

When a volume hologram is used like the U.S. patent, the reference beam should be incident on a volume holographic area having a large angle selectivity to enhance reproduction efficiency of a reproduction beam.

When the incident angle of a reference beam incident on the recording medium storing optical information is in the range of Brag angle, the reproduction efficiency of a reproduction beam reproduced in response to the reference beam is enhanced.

The incident angle of the reference beam is determined in accordance with the tilt angle of the recording medium. A diffraction efficiency of the reference beam incident on the recording medium depends on the incident angle of the reference beam (that is, the tilt angle of the recording medium). When the incident angle of the reference beam varying depending on the tilt angle of the recording medium departs from the range of Brag angle, the reproduction efficiency of the reproduction beam is markedly reduced.

Accordingly, it is necessary to detect whether a tilt error occurs between the reference beam and the recording medium and to correct the tilt error, at the time of recording data in the recording medium or reproducing data from the recording medium.

SUMMARY

Embodiment of the invention is contrived to solve the above-mentioned problem. An advantage of some aspect of the invention is to provide an optical information reproducing apparatus and an optical information reproducing method, which can detect a tilt angle of a recording medium by inputting an assistant beam to the recording medium at the time of reproducing optical information and correct a tilt error.

According to an aspect of the invention, there is provided an optical information reproducing apparatus including: a light source; a beam splitter which splits a beam emitted from the light source into a reference beam and a temporary beam; a temporary beam splitter which splits the temporary beam into a pair of assistant beams; an incident optical system which inputs the reference beam and the assistant beams to a recording medium in which optical information is recorded; a reproduction beam detector which detects a reproduction beam reproduced in response to the reference beam; and an assistant beam detector which detects light intensity of the assistant beams diffracted by the optical information to read out a tilt angle of the recording medium.

According to another aspect of the invention, there is provided an optical information reproducing method comprising the steps of: inputting a reference beam and an assistant beam to a recording medium in which multiplexed optical information is stored; detecting the assistant beam diffracted by the optical information to measure a tilt angle of the recording medium; comparing the measured tilt angle of the recording medium with a set value; determined the tilt angle of the recording medium; setting an incident angle of the reference beam on the basis of the determined tilt angle of the recording medium; and correcting the incident angle of the reference beam on the basis of the set incident angle of the reference beam.

According to another aspect of the invention, there is provided an optical information reproducing method comprising the steps of: inputting a reference beam to a recording medium in which multiplexed optical information is stored; scanning the optical information while tilting the reference beam; detecting the optical information emitting the largest light intensity in response to the reference beam from the scanned optical information and setting the position of the optical information emitting the largest light intensity as a reference position; setting a signal region on the basis of the reference position; and controlling an incident angle of the reference beam on the basis of the position of the optical information in the signal region with respect to the reference position.

According to another aspect of the invention, there is provided an optical information reproducing method comprising the steps of: inputting a plurality of assistant beams to a recording medium in which optical information is stored; detecting the assistant beams diffracted by the recording medium; comparing the detected assistant beams with set values of the assistant beams; and calculating a tilt angle of the recording medium on the basis of the comparison result.

DESCRIPTION OF EXEMPLARY EMBODIMENTS

Hereinafter, an optical information reproducing apparatus, an optical information recording/reproducing apparatus, and an optical information reproducing method using the same will be described in detail with reference to the attached drawings.

In the following description, names of elements are defined in consideration of functions thereof. Accordingly, the names of elements should not be understood as defining technical constituent components and may be called other names in the art.

Figure 1:
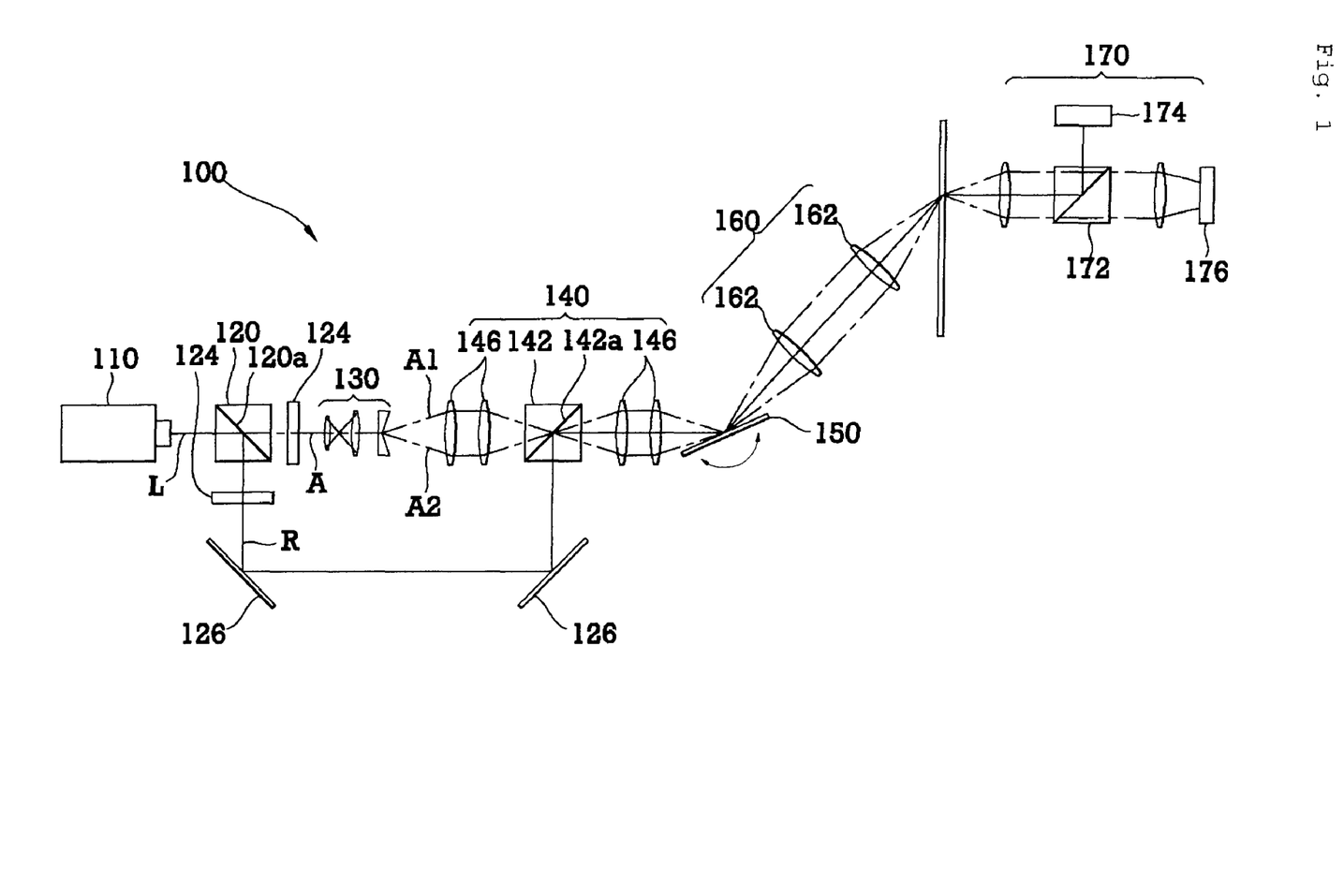
FIG. 1 is a diagram illustrating a configuration of an optical information reproducing apparatus according to an exemplary embodiment of the present invention.

First, an example of an optical information reproducing apparatus will be described with reference to FIG. 1. As shown in the figure, the optical information reproducing apparatus 100 includes a light source 110, a polarizer beam splitter 120, a temporary beam splitter 130, an overlapping optical system 140, a focusing optical system 160, and a readout unit 170.

The light source 110 emits a beam L having a predetermined wavelength. The beam L emitted from the light source 110 is preferably a laser beam which is made to be a parallel beam and is of a type of a plane wave having an excellent coherent. For example, the beam L preferably has a wavelength suitable for storing holographic data.

The polarizer beam splitter 120 splits a beam emitted from the light source 110 into a reference beam R for reproducing optical information and a temporary beam A for generating first and second assistant beams A1 and A2. The polarizer beam splitter 120 has a polarizer splitting plane 120a for polarizing and splitting a beam L. The polarizer beam splitter 120a serves to transmit the temporary beam (P polarized beam) A and to reflect the reference beam (S polarized beam) S.

A particular light source adjusting member 124 for adjusting the reference beam R and the first and second assistant beams A1 and A2 split by the polarizer beam splitter 120 may be provided. The light source adjusting member 124 can be provided as a polarizing plate, a photosensitive filter, or the like. The light source adjusting member 124 is provided to precisely adjust the light intensity and uniformity of the reference beam R and the first and second assistant beams A1 and A2, and may not be provided when the characteristics of the reference beam R and the temporary beam A are secured.

The polarizer beam splitter 120 may be replaced with a non-polarizer beam splitter (not shown). In this case, the light source adjusting member 124 may be replaced with an S polarizing plate and a P polarizing plate for polarizing the reference beam R and the temporary beam A, which are split by the non-polarizer beam splitter, into an S polarized beam and a P polarized beam, respectively.

The temporary beam splitter 130 serves to split the temporary beam A split by the polarizer beam splitter 120 into the first and second assistant beams A1 and A2. The temporary beam splitter 130 is provided in a path through which the temporary beam A passes. The temporary beam splitter 130 may be provided as a prism spectroscope, a hologram spectroscope, or the like.

A plurality of reflecting mirrors 126 for directing the reference beam R to the overlapping optical system 140 is further provided in an optical path of the reference beam R separated by the polarizer beam splitter 120. The reflecting mirrors 126 are preferably Galvano mirrors for adjusting the optical path of the reference beam R.

The overlapping optical system 140 serves to overlap the first and second assistant beams A1 and A2 and the reference beam R to be parallel to the optical axis. The overlapping optical system 140 includes a beam overlapping device 142, a refracting mirror 150, and a focusing lens 146.

The beam overlapping device 142 has an overlapping plane 142a for transmitting the first and second assistant beams A1 and A2 and reflecting the reference beam R. The first and second assistant beams A1 and A2 are transmitted and the reference beam R is reflected by the overlapping plane 142a, whereby the beams are overlapped.

The reference beam R and the first and second assistant beams A1 and A2 overlapped by the beam overlapping device 142 are incident on the focusing optical system 160 by the refracting mirror 150. The refracting mirror 150 is formed preferably of a Galvano mirror.

The focusing optical system 160 serves to input the overlapped reference beam R and first and second assistant beams A1 and A2 to the recording medium D. The focusing optical system 160 includes a plurality of focusing lenses 162. The optical paths of the first and second assistant beams A1 and A2 passing through the focusing optical system 160 have preferably the same length. The light intensities of the first and second assistant beams A1 and A2 incident on the recording medium D should be equal to each other as much as possible or equal to each other within an error range.

The readout unit 170 serves to read out the reference beam R and the first and second assistant beams A1 and A2 incident on the recording medium D. The readout unit 170 includes a readout beam splitter 172, a reproduction beam detector 174, and an assistant beam detector 176.

The readout beam splitter 172 serves to split a reproduction beam reproduced while the first and second assistant beams A1 and A2 and the reference beam R pass through the recording medium D. The readout beam splitter 172 transmits the first and second assistant beams A1 and A2 to the assistant beam detector 176 and reflects the reference beam R to the reproduction beam detector 174.

The reproduction beam detector 174 serves to detect the reproduction beam reproduced from the recording medium D in response to the reference beam R. The reproduction beam detector 174 may employ an image sensing device having a pixel array such as a CCD (Charge Coupled Device) and a CMOS (Complementary Metal Oxide Semiconductor) device The assistant beam detector 176 detects the intensities and positions of the first and second assistant beams A1 and A2 diffracted along with the reference beam R at the time of reproducing optical information by the use of the reference beam. The assistant beam detector 176 determines a tilt error of the reference beam R and the recording medium D on the basis of the detection result. The assistant beam detector 176 employs a plurality of photodiodes P1, . . . , and Pn arranged to correspond to the movement areas of the first and second assistant beams A1 and A2 passing through the recording medium D (see FIGS. 9 and 10).

Figure 9:
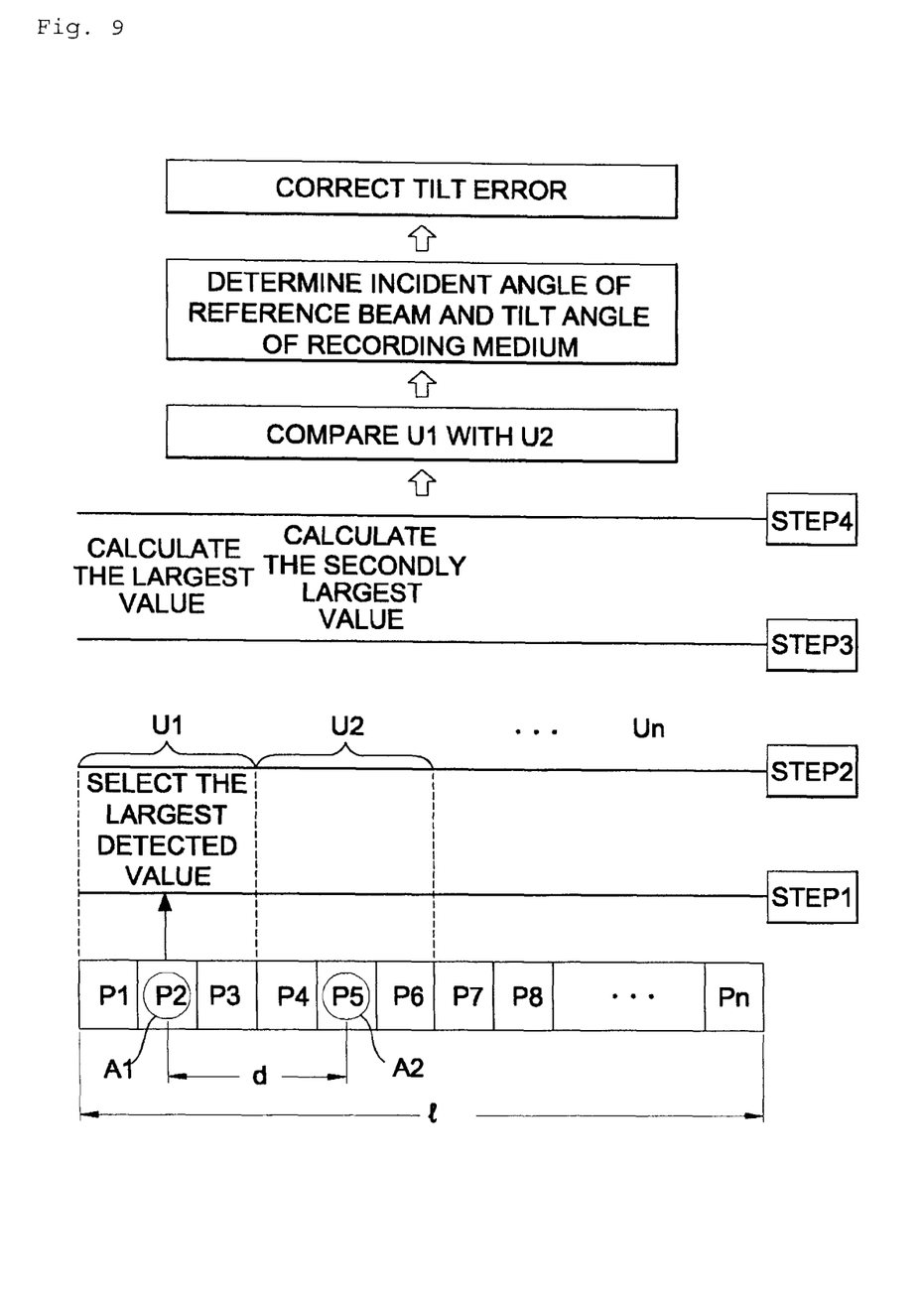
FIGS. 9 to 10 are diagrams illustrating an assistant beam detecting process of the optical information reproducing method according to the exemplary embodiment of the invention.
Figure 10:
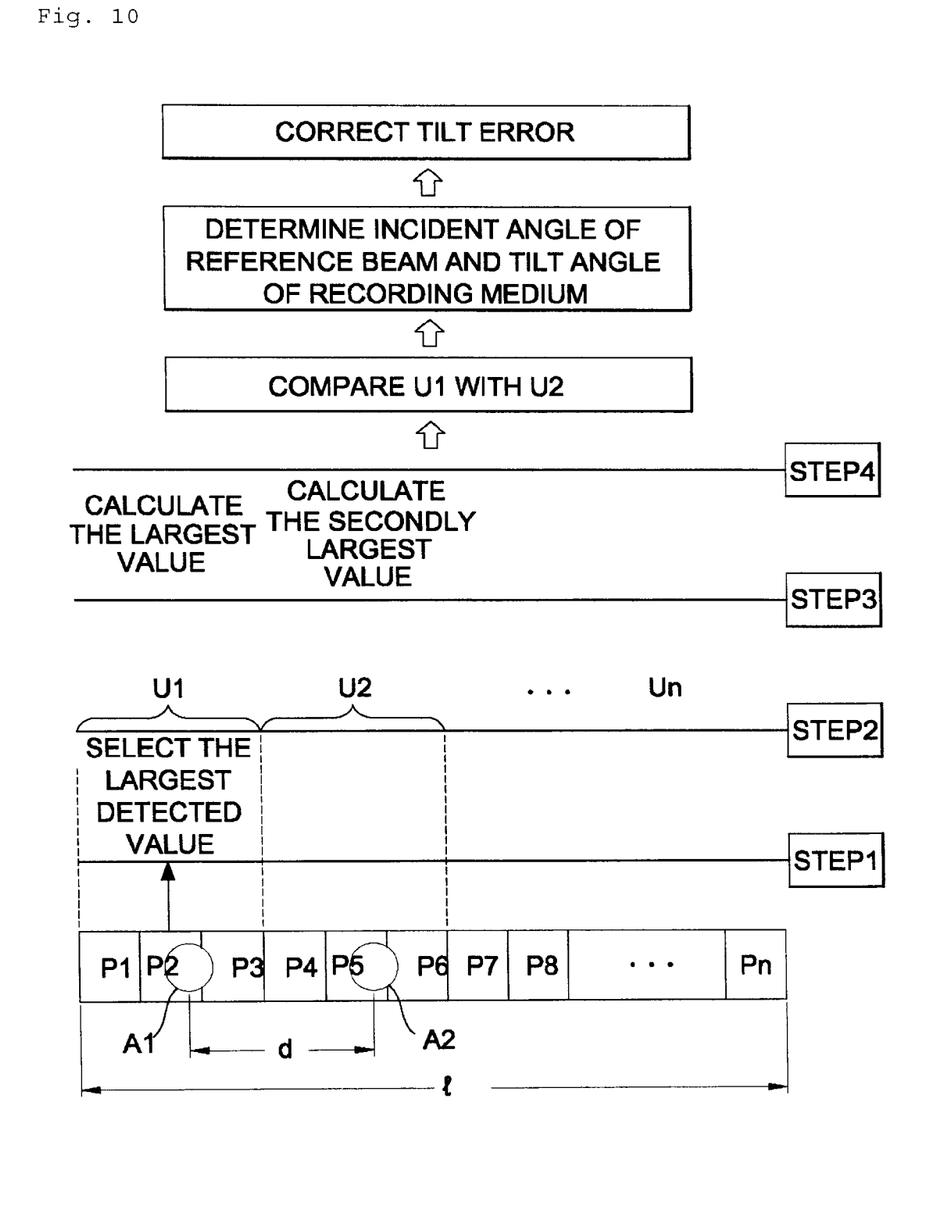

The arrangement of the photodiodes P1, . . . , and Pn should be longer than the total length of the distance d between the incident points of the first and second assistant beams A1 and A2 and the movement distance of the first and second assistant beams A1 and A2 at the time of tilting. At least several to several tens photodiodes P1, . . . , and Pn may be combined and arranged. A CCD or a CMOS device can be used as the assistant beam detector 176. Any thing can be modified and employed suitably for embodiments.

The intensities and positions of the first and second assistant beams A1 and A2 detected by the assistant beam detector 176 are used to determine the tilt angle of the recording medium D through which the first and second assistant beams A1 and A2 pass.

When the first and second assistant beams A1 and A2 are refracted along with the reference beam R while passing through the recording medium D, the light intensities and positions of the first and second beams A1 and A2 can be measured to determine the tilt angle of the recording medium D.

Hereinafter, the reproduction of optical information in the optical information reproducing apparatus will be described in brief.

A beam L is emitted from the light source 110 to reproduce optical information. The emitted beam L is split into a reference beam R and a temporary beam A by the polarizer beam splitter 120. The characteristics (such as intensity, uniformity, and polarization) split reference beam R and temporary beam A is adjusted by the light source adjusting member 124. The adjusted temporary beam A is split into first and second assistant beams A1 and A2 by the temporary beam splitter 130.

The split first and second assistant beams A1 and A2 are incident on the overlapping optical system 140 for the overlapping with the reference beam R. The first and second assistant beams A1 and A2 incident on the overlapping optical system 140 are overlapped with the reference beam R to be parallel to an optical axis and travel to the refracting mirror 150. The reference beam R and the first and second assistant beams A1 and A2 overlapped with the reference beam are incident on the recording medium D by the refracting mirror 150.

The reference beam R incident on the recording medium D is refracted by an interference pattern formed in the recording medium D, thereby generating a reproduction beam. The reproduction beam is read out by the reproduction beam detector 174.

The first and second assistant beams A1 and A2 are incident on the same position on the recording medium D on which the reference beam R is incident. At this time, the reference beam R may be incident along with the first and second assistant beams A1 and A2 or only the first and second assistant beams A1 and A2 may be incident. The intensities of the incident first and second assistant beams A1 and A2 should be equal to each other as much as possible or equal to each other within an error range.

The first and second assistant beams A1 and A2 incident on the recording medium D pass through the recording medium D and are detected by the assistant beam detector 176. The assistant beam detector 176 detects the intensities and positions of the detected first and second assistant beams A1 and A2.

The intensities and positions of the first and second assistant beams A1 and A2 detected by the assistant beam detector 176 are used as data for reading out the incident angle of the reference beam R and the tilt angle of the recording medium D.

An example of the optical information recording/reproducing apparatus will be now described with reference to FIGS. 2 and 3. The optical information recording/reproducing apparatus 200 has a structure that an optical system for generating a signal beam S for recording optical information is added to the above-mentioned optical information reproducing apparatus 100. The same configuration as that of the optical information reproducing apparatus 100 will not be described in detail.

Figure 2:
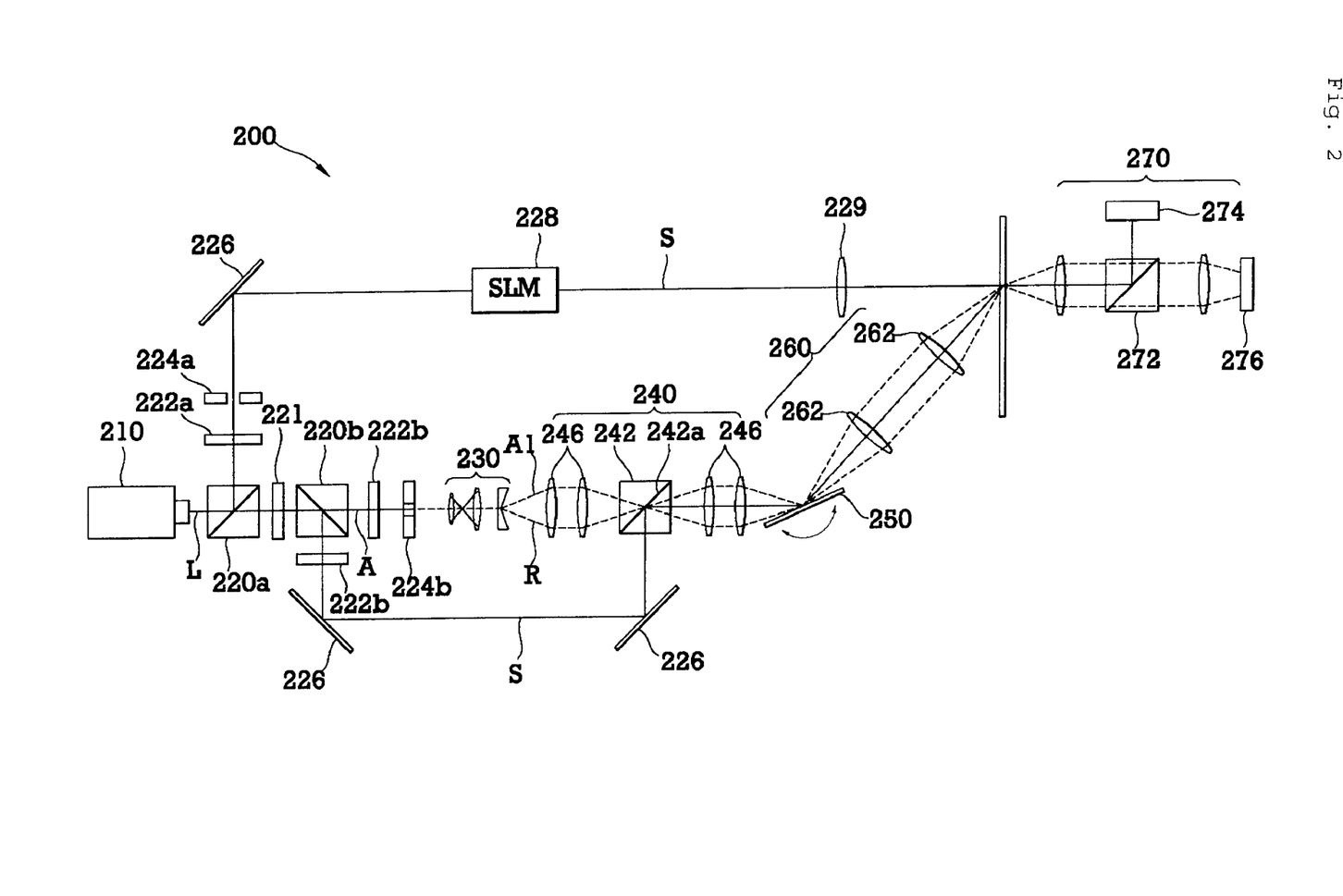
FIG. 2 is a diagram illustrating a configuration of an optical information recording/reproducing apparatus according to another exemplary embodiment of the invention, where an optical path at the time of recording optical information is schematically illustrated.
Figure 3:
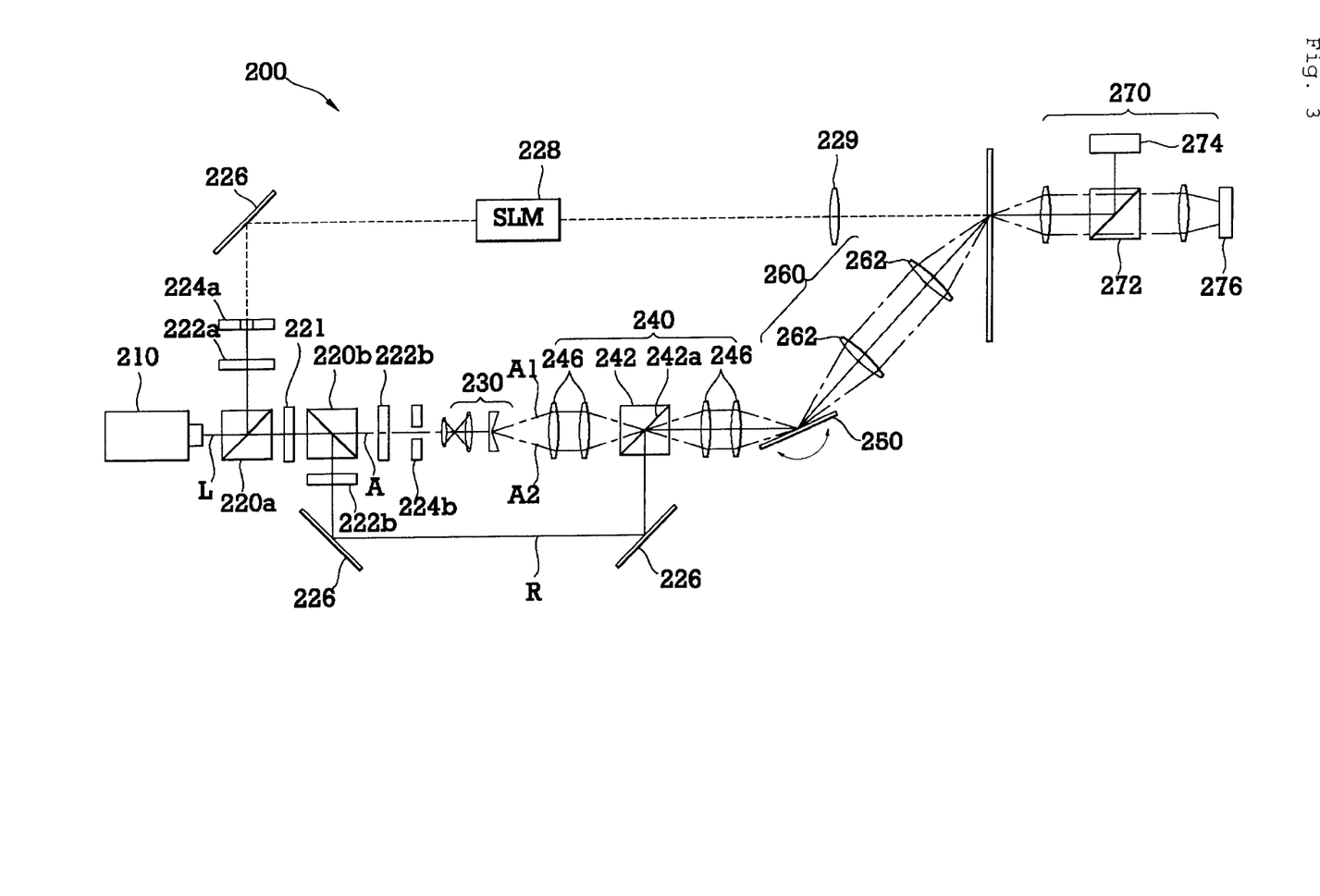
FIG. 3 is a diagram illustrating a configuration of an optical information recording/reproducing apparatus according to another exemplary embodiment of the invention, where an optical path at the time of reproducing optical information is schematically illustrated.

As shown in FIGS. 2 and 3, the optical information recording/reproducing apparatus 200 includes a light source 210, a non-polarizer beam splitter 220a, a polarizer beam splitter 220b, a temporary beam splitter 230, an overlapping optical system 240, a refracting mirror 250, a focusing optical system 260, and a readout unit 270.

The light source 210, the polarizer beam splitter 220b, the temporary beam splitter 230, the overlapping optical system 240, the refracting mirror 250, the focusing optical system 260, and the readout unit 270 are similar to those of the above-mentioned optical information reproducing apparatus and thus detailed description thereof will be omitted.

The non-polarizer beam splitter 220a serves to split a beam L emitted from the light source 210 so as to form a signal beam S and a reference beam R. One split beam is polarized by the light source adjusting member 222a to form the signal beam S. The split other beam is incident on the polarizer beam splitter 220b and is split into the reference beam R and the temporary beam A.

One beam split by the non-polarizer beam splitter 220a is polarized into a P polarizer beam by the light source adjusting member 222a to form the signal beam S. A shutter 224a, a spatial light modulator 228, and a Fourier transform lens 229 are provided in an optical path of the signal beam S.

The shutter 224a shuts the optical path of the signal beam S at the time of reproducing optical information from the recording medium D. The spatial light modulator 228 loads data onto the signal beam S. The Fourier transform lens 229 transforms the signal beam S by the Fourier transformation and inputs the transformed signal beam S to the recording medium D.

The spatial light modulator 228 can employ a TFT LC (This Film Transistor Liquid Crystal) device representative of an active matrix device, an STN LC (Super Twisted Nematic Liquid Crystal) device representative of a passive matrix device, a ferro LC device, a PDLC (Polymer Dispersed Liquid Crystal) device, or a plasma addressing LC device.

Recording and reproduction operations of the optical information recording/reproducing apparatus will be described now.

The operation of recording optical information is first described. A beam L is emitted from the light source 210. The emitted beam L is split into a pair of beams for generating a signal beam S and a reference beam R by the non-polarizer beam splitter 220a. The split one beam is polarized into a P polarizer beam and is converted into the signal beam S by the light source adjusting member 222a.

While the signal beam S passes through the spatial light modulator 228, data are loaded onto the signal beam S by the spatial light modulator 228. The signal beam S in which the data are loaded is incident on the recording medium through the Fourier transform lens 229.

The other beam split by the non-polarizer beam splitter 220a is incident on the polarizer beam splitter 220b and is split into the reference beam R and the temporary beam A. The temporary beam A is not required to record optical information and thus is intersected by the shutter 224b.

The reference beam R split by the polarizer beam splitter 220b is incident on the overlapping optical system 240 by a plurality of reflecting mirrors 226. The reference beam R incident on the overlapping optical system 240 is incident on the recording medium D through the refracting mirror 250 and the focusing optical system 260.

A holographic interference pattern is formed on the recording medium D by the signal beam S and the reference beam R incident on the recording medium D. The holographic interference pattern is data for reproduction of the recording medium D.

The operation of reproducing the optical information will be described now. A beam L is emitted from the light source 210. The emitted beam L is split into a pair of beam for generating a signal beam S and a reference beam R by the non-polarizer beam splitter 220a. The beam for generating the signal beam S is intersected by the shutter 224a.

The other beam split by the non-polarizer beam splitter 220a is incident on the polarizer beam splitter 220b and is split into the reference beam R and the temporary beam A. The reference beam R is incident on the overlapping optical system 240 by a plurality of reflecting mirrors 226.

The temporary beam A is split into first and second assistant beams A1 and A2 by the assistant beam splitting optical system 230. The first and second assistant beams A1 and A2 are incident on the overlapping optical system 240 and are overlapped with the reference beam R. The overlapped first and second assistant beams A1 and A2 and reference beam R are directed to the focusing optical system 260 by the refracting mirror 250.

The reference beam R and the first and second assistant beams A1 and A2 are incident on the recording medium D by the focusing optical system 260. The reference beam R incident on the recording medium D is converted into a reproduction beam by the interference pattern formed on the recording medium D. The reproduction beam and the first and second assistant beams A1 and A2 passing through the recording medium D are incident on the readout optical system 270.

The reproduction beam and the first and second assistant beams A1 and A2 incident on the readout optical system 270 are separated from each other by the readout beam splitter 272. The reproduction beam is read out by the reproduction beam detector 274 and the first and second assistant beams A1 and A2 are read out by the assistant beam detector 276.

The intensities and positions of the first and second assistant beams A1 and A2 detected by the assistant beam detector 276 are used as data for reading out the incident angle of the reference beam R and the tilt angle of the recording medium D.

A method of correcting a tilt error of a recording medium in the optical information reproducing apparatus and the optical information recording/reproducing apparatus described above will be described now. The constituent elements are referenced by the reference numerals of the optical information reproducing apparatus. They may be also referenced by the reference numerals of the optical information recording/reproducing apparatus. Alternatively, they may be embodied in modified examples thereof.

An optical information reproducing method according to an exemplary embodiment will be described with reference to FIG. 4.

Figure 4:
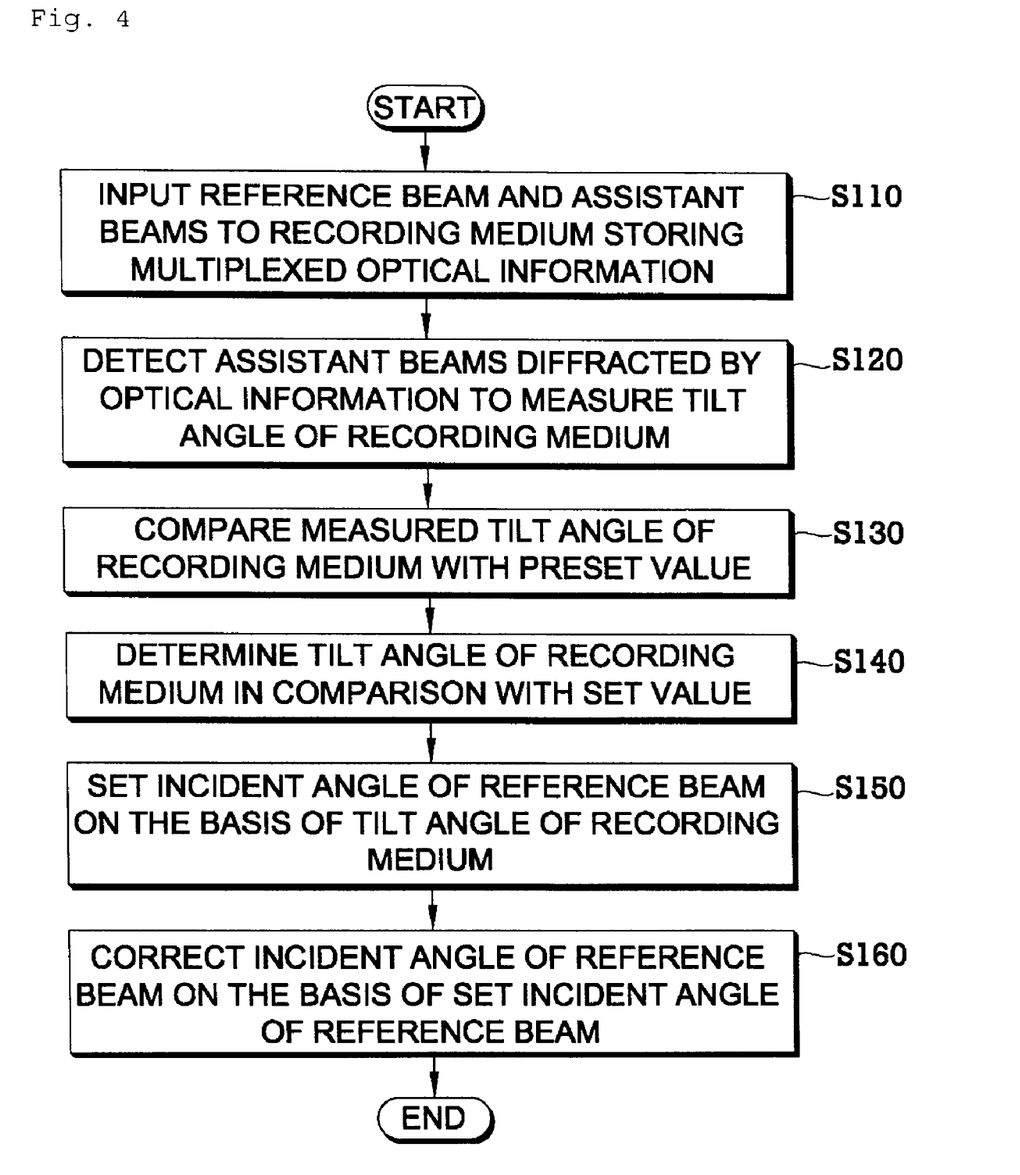
FIG. 4 is a flowchart illustrating an optical information reproducing method according to an exemplary embodiment of the invention.

As shown in FIG. 4, in the optical information reproducing method, the reference beam R is incident on the recording medium D. The first and second assistant beams A1 and A2 may be incident along with the reference beam R incident on the recording medium D (beam inputting step (S110)).

A holographic interference pattern is formed on the recording medium D in an angle multiplexing method so as to generate a diffraction of a beam. The first and second assistant beams A1 and A2 are incident at the same position on the recording medium D. The intensities of the incident first and second assistant beams A1 and A2 should be equal to each other as much as possible or equal to each other within an error range.

The first and second assistant beams A1 and A2 incident on the recording medium D are diffracted by the interference pattern formed on the recording medium D while passing through the recording medium D. The diffracted first and second assistant beams A1 and A2 are detected by the assistant beam detector 176 (detection step (S129)). At the time of detecting the first and second assistant beams A1 and A2, the light intensities and positions of the first and second assistant beams A1 and A2 are measured. The first and second assistant beams A1 and A2 are sensed by a plurality of photodiodes P1, and Pn provided in the assistant beam detector 176 (see FIGS. 9 and 10).

When the first and second assistant beams A1 and A2 are read out completely, the readout information of the first and second assistant beams A1 and A2 is compared with the previously set information of the first and second assistant beams A1 and A2 to determine whether the difference value therebetween is smaller than a set error value (comparison step (S130)). The set error value is a value satisfying the optimal operating condition and operating conditions associated with difference values other than the set error value may be stored in advance in a lookup table.

When the difference value is smaller than the set error value, the process of reproducing optical information by inputting the reference beam R to the recording medium 110.

When the difference value is larger than the set error value, it is judged that the incident angle of the reference beam R determined by the tilt angle of the recording medium D is not the "Bragg angle" and thus the tilt angle of the recording medium D is not correct (judgment step (S140)).

By repeatedly inputting the first and second assistant beams A1 and A2 to the same position and repeatedly comparing the detected value with the set error value, the tilt angle of the storage medium D may be determined more accurately.

By comparing the detected values of the first and second assistant beams A1 and A2 with the set value, the incident angle of the reference beam R is set (incident angle setting step (S150)). By comparing the light intensities of the first and second assistant beams A1 and A2 incident along with the reference beam R, the incident angle of the reference beam R can be calculated. Through the comparison of the first and second assistant beams A1 and A2, the incident angle of the reference beam R can be determined on the basis of the position at which little difference or the least difference is between the first and second assistant beams A1 and A2.

The tilt error of the recording medium D is corrected to form the preset incident angle of the reference beam R (correction step (S160)). The correction of the tilt error of the recording medium D may be performed by correcting the tilt angle of the recording medium D or correcting the incident angle of the reference beam R.

Figure 5:
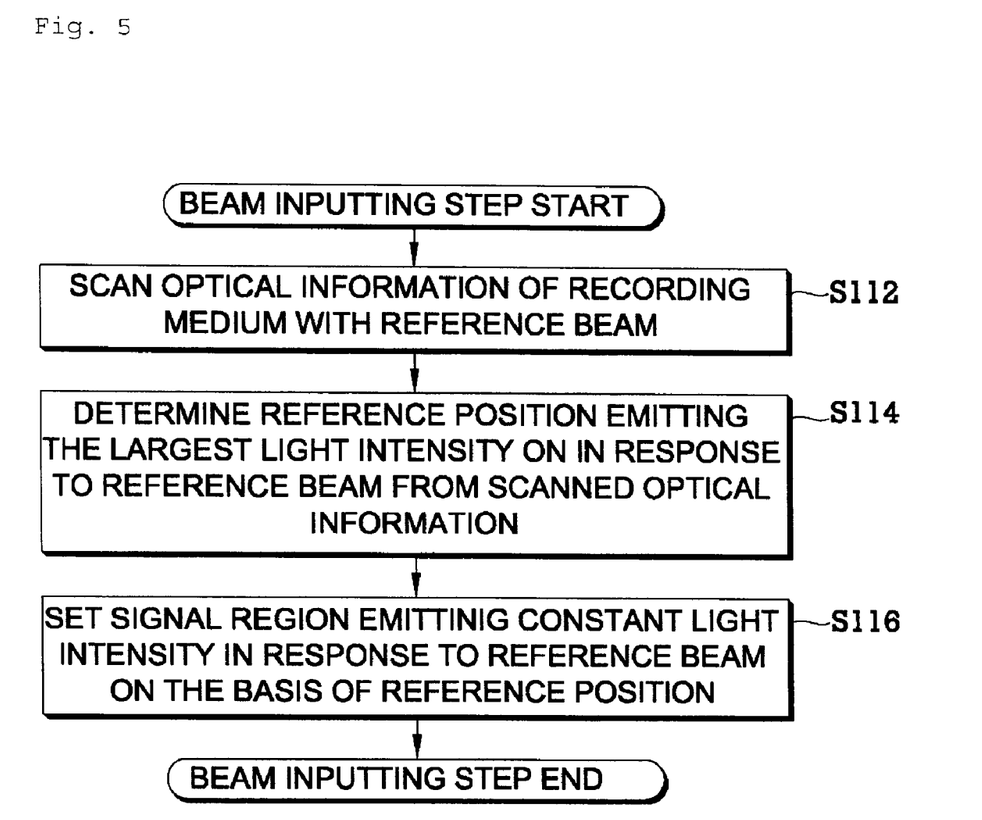
FIG. 5 is a flowchart illustrating a beam input step of the optical information reproducing method according to the exemplary embodiment of the invention.

The beam inputting step (S110) of the optical information reproducing method will be described in detail with reference to FIG. 5.

In the beam inputting step (S110), the optical information stored in an angle multiplexing method at the position on which the reference beam R is incident by tilting the reference beam R (or the first and second assistant beams A1 and A2) incident on the recording medium D (scanning step (S112)).

It is assumed that the reference beam R and the first and second assistant beams A1 and A2 incident on the recording medium D have the same light intensity. "θ" denotes an angle at which the first and second assistant beams A1 and A2 are incident on the recording medium D.

Figure 6:
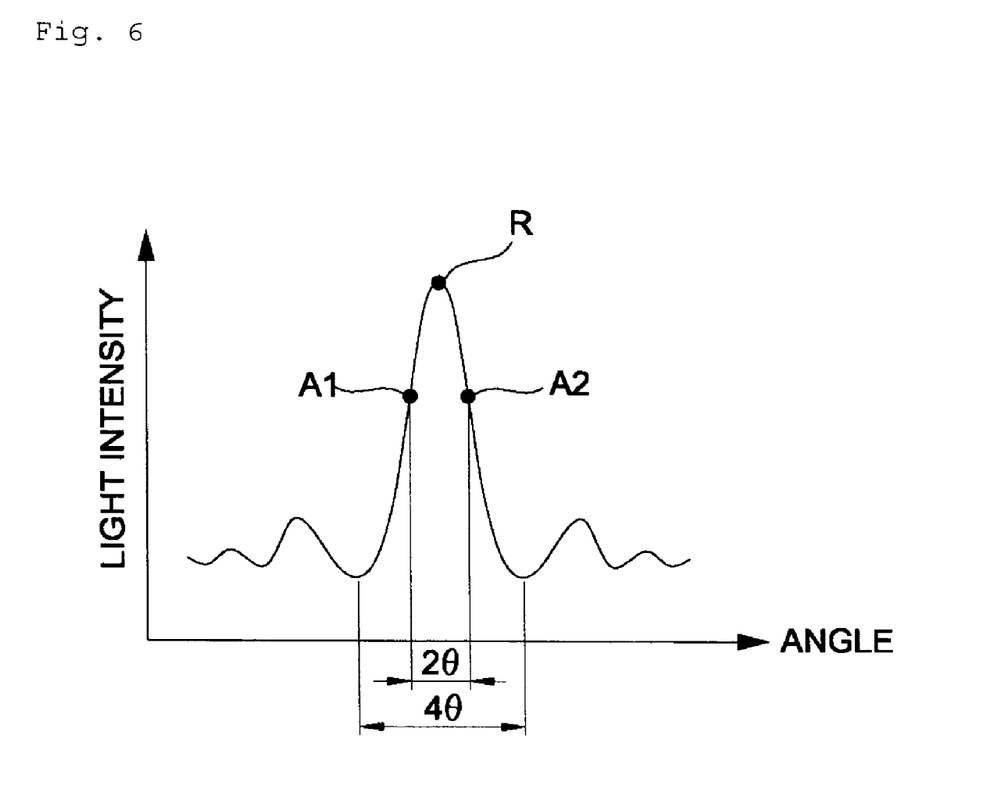
FIGS. 6 and 7 are schematic diagrams illustrating a light intensity-angle selectivity curve for correcting a tilt error in the optical information reproducing method according to the exemplary embodiment of the invention.
Figure 7:
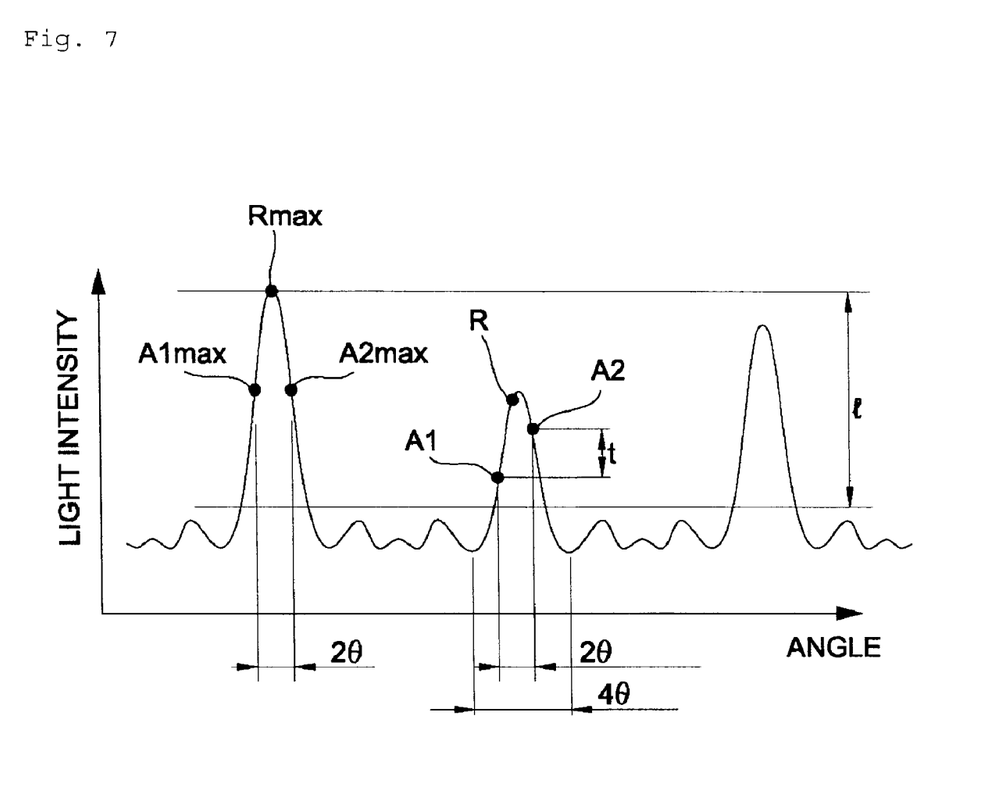

A light intensity-angle selectivity curve of the scanned optical information is shown in FIGS. 6 and 7.

FIG. 6 is a schematic diagram illustrating a light intensity-angle selectivity curve when the optical information stored in the recording medium is not multiplexed. As shown in the figure, when the light intensities of the first and second assistant beams A1 and A2 incident at the same angle are located at the same position on both inclinations of the peak curve, the tilt angle of the recording medium D is formed so that the diffraction efficiency of the reference beam R incident on the recording medium D is the largest, which means that the incident angle of the reference beam R determined by the tilt angle of the recording medium D is located at the "Bragg angle."

FIG. 7 is a schematic diagram illustrating a light intensity-angle selectivity curve when the optical information stored in the recording medium is multiplexed. As shown in the figure, when the light intensities of the first and second assistant beams A1 and A2 incident at the same angle is located with a predetermined difference t, the incident angle of the reference beam R determined by the tilt angle of the recording medium D is not located at the "Bragg angle", which means that the diffraction efficiency of the reference beam R decreases.

Description is made now with reference to FIG. 7. the optical information stored in an angle multiplexing method in the recording medium D is scanned by the use of the angle multiplexing method (scanning step (S112)). The position of the optical information having the largest light intensity among the scanned optical information is set as a reference position Rmax (reference position setting step (S114)).

The reference position Rmax is used to set the optical information which serves as a reference among the scanned optical information. The reference position Rmax serves as a reference for reproducing the other optical information among the angle-multiplexed information.

After setting the reference position Rmax of the optical information, a signal region 1 for the reproduction beams is set on the basis of the reference position Rmax (signal region setting step (S116)). The signal region 1 serves to easily move between the angle-multiplexed optical information pieces by excluding the noises generated between the angle-multiplexed optical information pieces on the basis of the reference position Rmax.

The signal region 1 can be determined by a constant value k previously set with respect to the reference position Rmax. The constant value k is a value between 0 and 1 and the position of the reproduction beam in the signal region 1 is always lower than the reference position Rmax. The constant value k can vary depending on the set state of the apparatus and can be set variable depending on the average light intensity of the scanned optical information.

At the time of setting the reference position Rmax as described above, the reference position Rmax may be inversely determined by the use of the largest light intensities A1max and A2max of the first and second assistant beams A1 and A2 corresponding to the reference position Rmax.

Since a constant gap is between the reference position A1max of the first assistant beam and the reference position A2max of the second assistant beam, the reference position Rmax can be inversely calculated by reading out the reference position A1max of the first assistant beam and the reference position A2max of the second assistant beam.

At the time of determining the reference position Rmax using the reference positions A1max and A2max of the first and second assistant beams, the position which satisfies R<k*Rmax and A1<k*A1max and A2<k*A2max satisfies Rmax>A1max and Rmax>A2max and A1max=A2max at the same time is set as the reference position Rmax.

The inverse determination of the reference position Rmax can be used to find out the optical information in reproduction when the reference beam R departs from specific optical information due to a variety of errors or an external impact at the time of reproducing the optical information.

In this way, the beam inputting step (S110) of inputting the reference beam R to the signal region 1 is completed.

Figure 8:
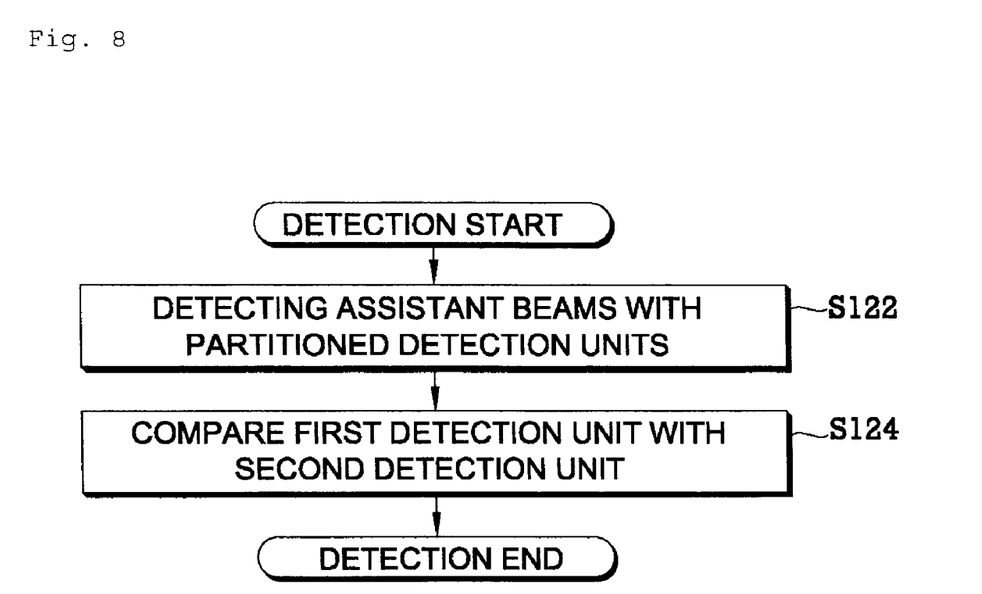
FIG. 8 is a flowchart illustrating a detection process of the optical information reproducing method according to the exemplary embodiment of the invention.

The detection step (S120) of the optical information reproducing method will be described in detail with reference to FIGS. 8 and 9.

The first assistant beams A1 and A2 passing through the recording medium D are detected by the assistant beam detector 176. The assistant beam detector 176 includes a plurality of photodiodes P1, . . . , and Pn and detects the first and second assistant beams A1 and A2 by partitioning the photodiodes P1, . . . , and Pn into a plurality of detection units (U1, . . . , and Un) (detection unit partitioning step (S112); see FIGS. 9 and 10).

The detection units U1, . . . , and Un detect the first and second assistant beams A1 and A2 passing through the recording medium D, thereby finding out the detection unit having the largest detected value and the detection unit U2 having the secondly largest value among the detection units U1, . . . , and Un. After the detection unit having the largest detected value and the detection unit U2 having the secondly largest value are found out, the detected values of the detection units U1 and U2 are compared with each other (detected value comparing step (S124)).

The setting of the detection unit Un is required because there are a case where each of the first and second assistant beams A1 and A2 is accurately incident on one photodiode Pn and a case where one assistant beam A1 or A2 is incident on two photodiodes Pn and Pn+1 in an overlapping manner.

There may occur the case where each of the first and second assistant beams A1 and A2 is detected by one photodiode Pn as shown in FIG. 9 and the case where one or more of the assistant beams A1 and A2 are detected by a plurality of photodiodes Pn and Pn+1 in an overlapping manner.

When one of the first and second assistant beams A1 and A2 is detected by one photodiode, the photodiode (hereinafter, referred to as "P2") having the largest detected value is selected among the photodiodes P1, ..., and Pn arranged in the assistant beam detector 176. Two photodiodes located on both sides of P2 and the photodiode P2 are set as a first detection unit U1, and the photodiodes are partitioned into the detection units U2, ..., and Un by binding the neighboring photodiodes by 3.

The light intensities of the detection units U1 and U2 are calculated and then the detection unit U1 having the largest light intensity and the detection unit U2 having the secondly largest light intensity are found out. Then, the light intensity of the first detection unit U1 is compared with the light intensity of the second detection unit U2.

As shown in FIG. 10, when the assistant beams A1 and A2 are focused on one or more photodiodes P1, ..., and Pn in an overlapping manner, it is possible to measure the light intensities of the first and second assistant beams A1 and A2 by partitioning the photodiodes P1, ..., and Pn into the detection units U2, ..., and Un in the same way as focusing the assistant beams A1 and A2 on one photodiode.

The distance d between the first and second assistant beams A1 and A2 detected by the assistant beam detector 176 is measured. The distance between the first and second assistant beams A1 and A2 can be obtained by calculating the distance between the photodiode detecting the largest light intensity and the photodiode detecting the secondly largest light intensity. The detected distance between the first and second assistant beams A1 and A2 can be determined more accurately than the preset distance between the first and second assistant beams A1 and A2.

The distance between the first and second assistant beams A1 and A2 is measured because one of the first and second assistant beams A1 and A2 may depart from the area of the assistant beam detector 176 when the tilt angle of the recording medium D is too large. In this case, the assistant beam detector 176 may detect one assistant beam and another beam (for example, a noise beam generated at the time of diffraction) detected by the assistant beam detector 176 as the assistant beams.

In this way, the incident angle of the reference beam R incident on the recording medium D or the tilt angle of the recording medium D on which the reference beam R is incident can be calculated by the use of the beams reproduced in response to the reference beam R and the first and second assistant beams A1 and A2.

It is possible to control the incident angle of the reference beam R or the tilt angle of the recording medium D on the basis of the calculated incident angle of the reference beam R incident on the recording medium D or the calculated tilt angle of the recording medium D on which the reference beam R is incident.

As described above, in the optical information reproducing apparatus, the optical information recording/reproducing apparatus, and the optical information reproducing method according to the exemplary embodiments of the invention, it is possible to correct a tilt error by allowing a reference beam and a pair of assistant beams to pass through a recording medium, detecting the reference beam and the assistant beams passing through the recording medium to determine the tilt angle of the recording medium, and determining whether the tilt error occurs.

What is claimed is:

1. An optical information reproducing apparatus comprising:
   a light source;
   a beam splitter which splits a beam emitted from the light source into a reference beam and a temporary beam;
   a temporary beam splitter which splits the temporary beam into a pair of assistant beams;
   an incident optical system which inputs the reference beam and the assistant beams to a recording medium in which optical information is recorded;
   a reproduction beam detector which detects a reproduction beam reproduced in response to the reference beam; and
   an assistant beam detector which detects light intensity of the assistant beams diffracted by the optical information to read out a tilt angle of the recording medium.

2. The optical information reproducing apparatus according to claim 1, wherein the reproduction beam detector detects reproduction beams reproduced in response to the reference beam, sets the position of the reproduction beam having the largest light intensity as a reference position, and sets a signal region on the basis of the reference position.

3. The optical information reproducing apparatus according to claim 2, wherein the assistant beam detector compares the light intensity of the pair of assistant beams incident on the signal area with each other and sets the incident angle of the reference beam.

4. The optical information reproducing apparatus according to claim 3, wherein the incident angle of the reference beam is set so that a difference in light intensity between the assistant beams is reduced.

5. The optical information reproducing apparatus according to claim 1, wherein the assistant beams are incident on the recording medium at different positions with a tilt angle about the reference beam.

6. The optical information reproducing apparatus according to claim 5, wherein the optical information recorded in the recording medium is a holographic interference pattern and the assistant beams are incident at the position at which the reference beam is incident and are diffracted along with the reference beam.

7. The optical information reproducing apparatus according to claim 1, wherein the reference beam and the assistant beams are incident at the same position on the recording medium, and wherein the apparatus further comprises a beam splitter which splits the reproduction beam reproduced from the recording medium and the assistant beams passing through the recording medium.

8. The optical information reproducing apparatus according to claim 7, wherein the assistant beam detector includes a plurality of photodiodes arranged in a tilt direction in which the reference beam is controlled.

9. The optical information reproducing apparatus according to claim 8, wherein the arrangement length of the photodiodes is larger than the total length of a distance between the incident positions of the assistant beams and a movement distance of the incident position of the reference beam at the time of controlling the tilt angle.

10. An optical information reproducing method comprising the steps of:

inputting a reference beam and an assistant beam to a recording medium in which multiplexed optical information is stored, scanning the optical information of the recording medium with the reference beam, setting a reference position emitting the largest light intensity in response to the reference beam from the scanned optical information, and setting a signal region emitting a predetermined light intensity in response to the reference beam on the basis of the reference position;

detecting the assistant beam diffracted by the optical information to measure a tilt angle of the recording medium;

comparing the measured tilt angle of the recording medium with a set value;

determined the tilt angle of the recording medium;

setting an incident angle of the reference beam on the basis of the determined tilt angle of the recording medium; and correcting the incident angle of the reference beam on the basis of the set incident angle of the reference beam.

11. The optical information reproducing method according to claim 10, wherein the step of detecting the assistant beam includes the steps of:

detecting a plurality of the assistant beams;

comparing the assistant beam having the largest detected value and the assistant beam having the secondly largest detected value with each other; and calculating a tilt angle of the recording medium on the basis of the comparison result.

12. The optical information reproducing method according to claim 11, wherein the step of correcting the incident angle of the reference beam includes a step of setting the incident angle of the reference beam so that a difference in light intensity between the compared assistant beams is reduced.

13. An optical information reproducing method comprising the steps of:

inputting a reference beam to a recording medium in which multiplexed optical information is stored;

scanning the optical information while tilting the reference beam;

detecting the optical information emitting the largest light intensity in response to the reference beam from the scanned optical information and setting the position of the optical information emitting the largest light intensity as a reference position;

setting a signal region on the basis of the reference position; and controlling an incident angle of the reference beam on the basis of the position of the optical information in the signal region with respect to the reference position.

14. The optical information reproducing method according to claim 13, wherein the step of inputting the reference beam includes the steps of:

inputting a plurality of assistant beams to the same position as the reference beam in the signal region;

detecting the light intensity of the assistant beams; and calculating the incident angle of the reference beam by comparing the light intensity of the assistant beams with each other.

15. The optical information reproducing method according to claim 13, wherein the step of calculating the incident angle of the reference beam includes a step of calculating the incident angle of the reference beam by comparing the assistant beam having the largest detected value and the assistant beam having the secondly largest detected value with each other.

16. An optical information reproducing method comprising the steps of:

inputting a plurality of assistant beams to a recording medium in which optical information is stored, inputting a reference beam for reproducing optical information to the recording medium in which the optical information is stored, scanning the optical information while tilting the reference beam, detecting the optical information emitting the largest light intensity in response to the reference beam from the scanned optical information and setting a position of the optical information emitting the largest light intensity as a reference position, and setting a signal region on the basis of the reference position;

detecting the assistant beams diffracted by the recording medium;

comparing the detected assistant beams with set values of the assistant beams; and calculating a tilt angle of the recording medium on the basis of the comparison result.

17. The optical information reproducing method according to claim 16, wherein the step of comparing the detected assistant beams includes a step of comparing the assistant beam having the largest detected value and the assistant beam having the secondly largest detected value with each other.

* * * * *